(12) United States Patent
Schuon

(10) Patent No.: US 6,905,292 B2
(45) Date of Patent: Jun. 14, 2005

(54) GEAR SHAPING MACHINE AND METHOD FOR THE OPERATION OF A GEAR SHAPING MACHINE

(75) Inventor: Joachim Schuon, Buchenberg (DE)

(73) Assignee: Lienherr-Verzahntechnik GmbH, Kempten (DE)

( * ) Notice: Subject to any disclaimer, the term of this patent is extended or adjusted under 35 U.S.C. 154(b) by 67 days.

(21) Appl. No.: 10/383,996

(22) Filed: Mar. 7, 2003

(65) Prior Publication Data
US 2003/0231935 A1 Dec. 18, 2003

(30) Foreign Application Priority Data
Mar. 7, 2002 (DE) .......................................... 102 09 971

(51) Int. Cl.⁷ .............................. B23F 5/00; B23F 5/16
(52) U.S. Cl. .............................. 409/2; 409/10; 409/27; 409/28
(58) Field of Search .............................. 409/2, 29, 31, 409/33, 36, 10, 25, 26, 28, 30, 38, 41, 42, 50, 51, 52, 53; 451/47, 219, 275

(56) References Cited

U.S. PATENT DOCUMENTS

| | | | |
|---|---|---|---|
| 3,722,359 A | * | 3/1973 | Hans et al. |
| 3,785,244 A | * | 1/1974 | Wildhaber .................... 409/12 |
| 4,025,764 A | * | 5/1977 | Tack .......................... 409/11 |
| 4,350,059 A | * | 9/1982 | Ainoura ...................... 409/293 |
| 5,116,173 A | * | 5/1992 | Goldrich ..................... 409/13 |
| 5,895,180 A | * | 4/1999 | Stadtfeld ..................... 409/13 |
| 6,390,894 B1 | * | 5/2002 | Beel et al. ................... 409/28 |

FOREIGN PATENT DOCUMENTS

| | | | |
|---|---|---|---|
| DE | 2042929 | * | 3/1972 |
| DE | 3314524 | | 10/1984 |
| DE | 3328904 | * | 2/1985 |
| DE | 4434059 | * | 1/1996 |
| DE | 19858669 | | 6/1999 |
| DE | 19918082 | * | 11/2000 |
| EP | 0074659 | | 3/1983 |
| EP | 0135064 | | 3/1985 |
| EP | 135064 A1 | * | 3/1985 ............. B23F/5/12 |

OTHER PUBLICATIONS

Patent Abstracts of Japan No. 622 366 19, Published Oct. 16, 1987 & JP 61075139 Filed Apr. 1, 1986.*

* cited by examiner

Primary Examiner—Derris H. Banks
Assistant Examiner—Dana Ross
(74) Attorney, Agent, or Firm—Dilworth & Barrese LLP.

(57) ABSTRACT

The invention relates to a gear shaping machine for the production, or more precisely machining, of gear wheels with a motor-driven rotatable machine table for holding the work-piece, a thrust spindle with a tool fixed thereto, preferably a cutting wheel, the thrust spindle being displaceable in a selective stroking and superimposed rotary motion, whereby the stroke position can be detected by a first measuring device arranged in the stroke drive, and to a method for the operation of the aforementioned gear shaping machine. The superimposed rotary motion of the thrust spindle is produced via a direct rotary drive and there is arranged in the area of the thrust spindle a second measuring device for the detection of errors in its movement path.

20 Claims, 1 Drawing Sheet

GEAR SHAPING MACHINE AND METHOD FOR THE OPERATION OF A GEAR SHAPING MACHINE

BACKGROUND OF THE INVENTION

The invention relates to a gear shaping machine for the production, or more precisely machining, of gear wheels with a motor-driven rotatable machine table for holding the work-piece and a thrust spindle with a tool fixed thereto, e.g. a cutting wheel, said thrust spindle being displaceable in a selective stroking and superimposed rotary motion, whereby the stroke position can be detected by a first measuring device arranged in the stroke drive.

With such gear shaping machines, the work-piece to be machined and the thrust tool perform a rotary motion during the production, or more precisely machining, of gear wheels. The rotation axes of the work-piece and of the cutting tool arranged on the thrust spindle are preferably arranged parallel to one another in the production of cylindrical work-pieces. A preferably linear stroking motion in the direction of the axis of the tool for the metal removal is superimposed here on the rotation of the thrust tool, i.e. the cutting wheel.

If gear wheels with spur toothing are being produced, the work-piece and the thrust tool are rotated to the same extent. If, on the other hand, gear wheels with helical toothing are being produced, a greater or lesser degree of additional rotation of the cutting wheel must take place depending on the helix angle of the toothing. Apart from the rolling-rotation, the cutting wheel must also perform an oscillating helical motion. This oscillating helical motion of the thrust spindle is forced by a helical guide in the embodiment according to the prior art. In the case of the gear shaping machines of the earlier design, these helical guides are designed as conventional sliding guides. Modern high-speed shaping machines, on the other hand, are equipped with hydrostatically mounted guides. These are largely wear-free and smooth-running, since mechanical friction is prevented. However, all helical guides have the drawback that only certain helix angles can be achieved therewith for the gear wheel to be produced. The usual gear shaping machines are equipped with a rigid helical guide. The following mathematical interrelationship emerges here for the helix angle that can be achieved with the gear wheel:

$$\sin\beta = \frac{m_n \cdot \pi \cdot z_0}{p_{p0}}$$

In this interrelationship, $\beta$ is the helix angle, $z_0$ the cutting wheel tooth number, $m_n$ the real pitch module and $p_{z0}$ the lead of the helical guide.

It follows from this that the helix angle $\beta$ on the work-piece is variable only in the area between the smallest and largest possible tool number of the thrust tool. Apart from this drawback, the whole drive train is in addition subject to play. Furthermore, it is elastically deformable. Various attempts have already been made in the past to provide, instead of the helical guides, more flexible drives for the rotary motion of the cutting wheel. Various solutions have been proposed, but ultimately have not led to satisfactory productivity and gear tooth quality.

The problem of the invention, therefore, is to provide a gear shaping machine of the known type, with which on the one hand desired gear tooth geometries of the gear wheels to be produced, or more precisely machined, can be arbitrarily set, whilst on the other hand a high gear tooth quality and a satisfactory productivity can be achieved in the production of gear wheels.

SUMMARY OF THE INVENTION

According to the invention, this problem is solved, proceeding from a generic gear shaping machine, by the additional features herein.

Accordinaly, the superimposed rotary motion of the thrust spindle is imparted via a direct drive and there is arranged on the thrust spindle a second measuring device for detecting the deviations with respect to its preset movement path.

Advantageous developments of the invention are set forth herein.

Accordingly, the stroke drive can consist of a motor-driven cam gear and a transmission linkage, which transmits the eccentric motion of the cam gear to the thrust spindle. Such stroke drives are in principle already known and are characterised by particularly robust behaviour, which is advantageous particularly in the case of the high stroke rates that are required for gear shaping machines. Stroke rates of more than 2000 strokes per minute are commonly used in the production and machining of gear wheels. The cam gear can be connected to a motor via a gear unit. The first measuring device can be designed as an angle measuring system for detecting the angle of rotation of the cam gear. In this way, the desired stroke position of the thrust spindle can thus be precisely inputted into the control of the gear shaping machine. The control performed on the basis of this information is corrected by means of the measurement signal according to the invention, which is picked up on the thrust spindle directly or indirectly via the second measuring device, so that any errors or inaccuracies of the stroke drive that are transmitted to the path of motion of the thrust spindle can be corrected.

The direct drive, by means of which the rotary motion is imparted to the thrust spindle, is preferably a brushless torque motor, such as is already known from the prior art. Such comparatively slowly rotating motors are characterized by a very high acceleration and extremely good precision.

The second measuring device is a length measuring device, which picks up the deviation of the current stroke position of the thrust spindle from the desired stroke of the thrust spindle.

The invention further relates to a method according to the invention for the operation of an aforementioned gear shaping machine. This method is characterised in that the error signal delivered by the second measuring device is used for the dynamic correction of the rotary motion of the thrust spindle and of the cutting wheel connected thereto and/or the rotary motion of the work-piece. The error signal is not therefore used, for example, for a pre-control of the stroke drive motor, but rather the error signal is used for the dynamic correction of the rotary motion of the thrust spindle. This rotary motion correction can either take effect with the rotary motion of the thrust spindle and thus of the cutting wheel connected thereto. Alternatively, however, the rotary motion of the work-piece can also be correspondingly corrected. Naturally, both rotary motions, i.e. that of the cutting wheel on the one hand and that of the work-piece on the other hand, can also be corrected until the total correction value is reached.

The dynamic correction of the rotary motion of the cutting wheel and jointly therewith the rotary motion of the work-piece can, be split up in dependence on the respective masses to be moved, in order to obtain a dynamic correction of the rotary motion that is as distortion-free as possible at the high feed rates.

BRIEF DESCRIPTION OF THE DRAWINGS

Further details and advantages will be explained in greater detail with the aid of an example of embodiment represented in the drawing. The following are shown.

DESCRIPTION OF THE PREFERRED EMBODIMENTS

Figure 1:
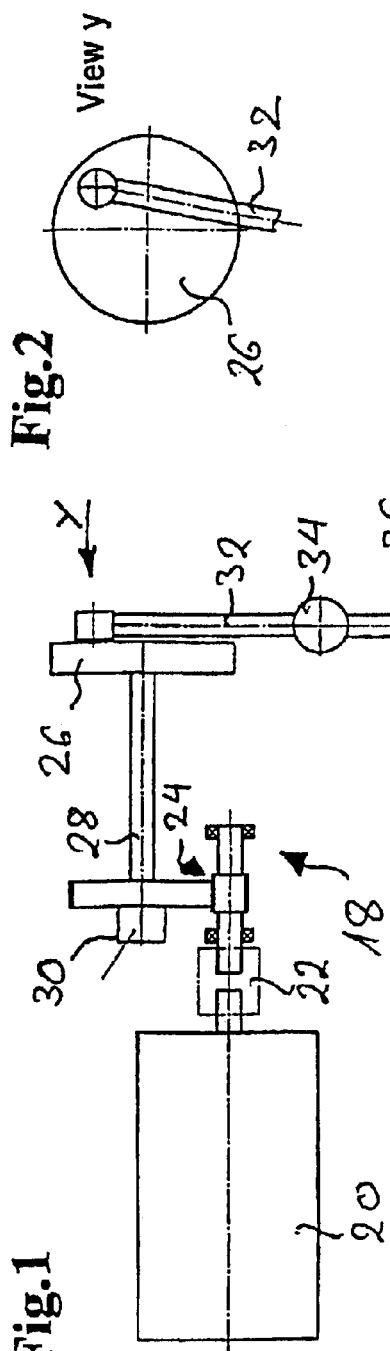
FIG. 1: a diagrammatic representation of a gear shaping machine in side view
Figure 2:
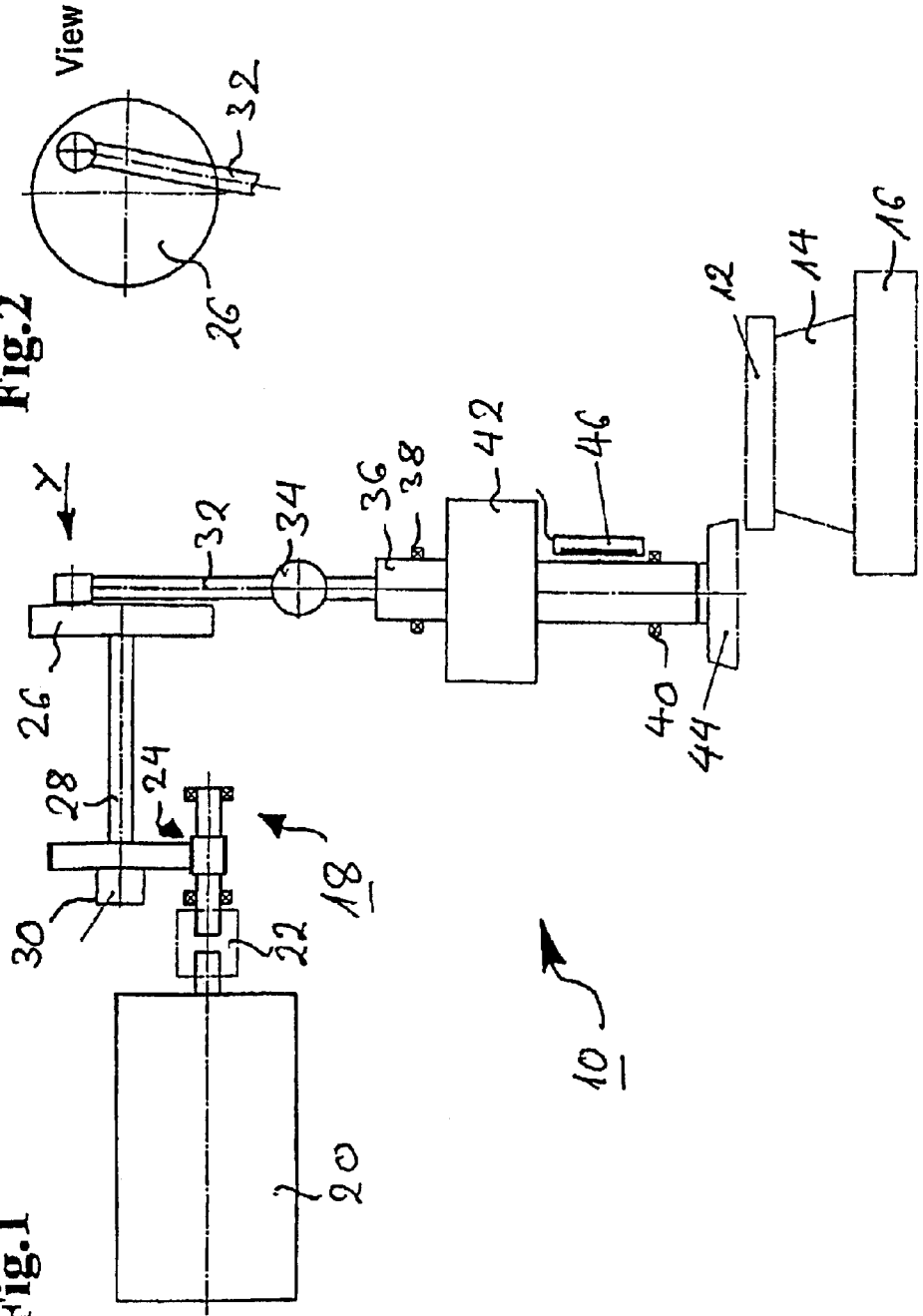
FIG. 2: a detail view from viewing direction y according to FIG. 1.

With the form of embodiment represented in FIG. 1 of gear shaping machine 10 according to the invention, a work-piece 12, from which a gear wheel is to be produced, is clamped on a machine table 14. Machine table 14 is rotatable by means of a drive 16, whereby drive 16 can be provided as a direct drive or as a motor gear unit.

Gear shaping machine 10 has a stroke drive 18, which here consists of a motor 20, which is in operative connection with a cam gear 26 via a coupling 22 and a toothed wheel gearing 24. An angle measuring device 30 is arranged on shaft 28 of cam gear 26. Angle measuring device 30 serves as a so-called first measuring device.

Rotatably linked to cam gear 26 is a transmission linkage 32, which is connected to a thrust spindle 36 via a further hinge joint 34. Thrust spindle 36 is mounted in a rotary manner about its symmetrical axis in the stroking direction and in the rotation direction, which is indicated here by bearings 38 and 40.

Thrust spindle 36 is set into a selective rotary motion about its own symmetrical axis by means of a direct drive 42. Direct drive 42 consists of a torque motor, which, whilst having a slow maximum rotational speed, on the other hand enables a very rapid acceleration of thrust spindle 36. Rigidly connected to thrust spindle 36 is a cutting wheel 44, which serves as the cutting tool for producing, or more precisely machining, gear wheel 12.

In a manner known per se, a defined angle of rotation of the cutting wheel is required for each stroke position of the cutting wheel in order to produce helical toothing. By means of a control not represented in detail here, it is ensured that a corresponding angle-of-rotation position corresponds to a corresponding stroke. In this way, it can be ensured that this unequivocal assignment also takes place with a stroke rate of more than 2000 strokes per minute. By means of angle measuring device 30, the stroke position can be determined to which a corresponding angle of rotation of cutting wheel 44 of course corresponds. Depending on the measured position of the angle of rotation of cam gear 26, the thrust spindle is thus rotated into the desired and unequivocally assigned angular position by means of direct rotary drive 42.

Since, however, stroke drive 18 is subject to error and a sufficiently good gear tooth quality with the gear wheels produced could not therefore be achieved without further measures when use is made of the direct rotary drive, an additional measuring device 46 is provided according to the invention in the area of the thrust spindle, which measuring device is designed here as a length measuring device and detects deviations of the current stroke of the thrust spindle from the desired stroke of the thrust spindle. The deviations of the actual stroke position from the desired stroke position ascertained here are not fed as a correction command to motor 20 in the manner of a pre-control. On the contrary, the correction value from measuring device 46 is used to correct the rotary motion of the thrust spindle and thus of the cutting wheel. A corresponding correction signal is thus applied here to direct rotary drive 42 in order to assign the ideally desired angle of rotation of cutting wheel 44 to the actual value of the stroke.

Instead of applying the correction value to direct rotary drive 42, a corresponding correction value can also be assigned to drive 16 of machine table 14. Alternatively, the corresponding correction value can also be distributed among direct rotary drive 42 and drive 16 of machine table 14.

The production of gear wheels by means of the gear shaping machine according to the invention leads to a considerable quality improvement, since the play in the crank operation of stroke drive 18 is compensated for completely dynamically.

What is claimed is:

1. A gear shaping machine for the production of gear wheels with a motor-driven rotatable machine table for holding a work-piece, a thrust spindle with a tool fixed thereto, said thrust spindle being displaceable in a selective stroking and superimposed rotary motion, whereby a stroke position of the thrust spindle can be detected by a first measuring device arranged in a stroke drive, wherein the superimposed rotary motion of the thrust spindle is generated by a direct rotary drive motor and arranged in the area of the thrust spindle, a second measuring device for detecting deviations with respect to a preset movement path of the thrust spindle.

2. The gear shaping machine according to claim 1, wherein the stroke drive is composed of a motor-driven cam gear and a transmission linkage, which transmits an eccentric motion of the cam gear to the thrust spindle.

3. The gear shaping machine according to claim 2, wherein the cam gear is connected with a motor by a gear unit.

4. The gear shaping machine according to claim 2, wherein the first measuring device is an angle measuring system for detecting an angle of rotation of the cam gear.

5. The gear shaping machine according to claim 1, wherein the direct rotary drive motor for imparting the rotary motion of the thrust spindle is a brushless torque motor.

6. The gear shaping machine according to claim 1, wherein the second measuring device is a length measuring device, which detects the deviation of a current stroke position of the thrust spindle from a desired stroke position of the thrust spindle.

7. A method for the operation of a gear shaping machine according to claim 1, wherein an error signal delivered by the second measuring device is used for a dynamic correction of at least one of the rotary motion of the thrust spindle, the cutting wheel connected thereto, and the work-piece.

8. The method for the operation of a gear shaping machine according to claim 7, wherein dynamic correction of a relative rotary motion between the thrust spindle and the cutting wheel connected thereto and a relative rotary motion between the thrust spindle and the work-piece can be split up among corrections to the rotary motion of the thrust spindle and the cutting wheel connected thereto and the rotary motion of the work-piece.

9. The gear shaping machine according to claim 3, wherein the first measuring device is an angle measuring system for detecting an angle of rotation of the cam gear.

10. The gear shaping machine according to claim 2, wherein the direct rotary drive for imparting the rotary motion of the thrust spindle is a brushless torque motor.

11. The gear shaping machine according to claim 3, wherein the direct rotary drive for imparting the rotary motion of the thrust spindle is a brushless torque motor.

12. The gear shaping machine according to claim 4, wherein the direct rotary drive for imparting the rotary motion of the thrust spindle is a brushless torque motor.

13. The gear shaping machine according to claim 9, wherein the direct rotary drive for imparting the rotary motion of the thrust spindle is a brushless torque motor.

14. The gear shaping machine according to claim 2, wherein the second measuring device is a length measuring device, which detects the deviation of a current stroke position of the thrust spindle from a desired stroke position of the thrust spindle.

15. The gear shaping machine according to claim 3, wherein the second measuring device is a length measuring device, which detects the deviation of a current stroke position of the thrust spindle from a desired stroke position of the thrust spindle.

16. The gear shaping machine according to claim 4, wherein the second measuring device is a length measuring device, which detects the deviation of a current stroke position of the thrust spindle from a desired stroke position of the thrust spindle.

17. The gear shaping machine according to claim 5, wherein the second measuring device is a length measuring device, which detects the deviation of a current stroke position of the thrust spindle from a desired stroke position of the thrust spindle.

18. The gear shaping machine according to claim 9, wherein the second measuring device is a length measuring device, which detects the deviation of a current stroke position of the thrust spindle from a desired stroke position of the thrust spindle.

19. The gear shaping machine according to claim 10, wherein the second measuring device is a length measuring device, which detects the deviation of a current stroke position of the thrust spindle from a desired stroke position of the thrust spindle.

20. The gear shaping machine according to claim 11, wherein the second measuring device is a length measuring device, which detects the deviation of a current stroke position of the thrust spindle from a desired stroke position of the thrust spindle.

* * * * *